June 21, 1966 B. S. SEDLEY 3,257,517

ELECTRICAL SWITCH MECHANISM OPERABLE BY ANY OF MANY INTERCHANGEABLE KEY ACTUATORS THAT ARE FREELY INSERTABLE IN AND FREELY REMOVABLE FROM A LOCK PROVIDING PROTECTION AGAINST OPERATION BY OTHER THAN A TRUE KEY ACTUATOR

Filed Feb. 15, 1961 5 Sheets-Sheet 1

INVENTOR.
BRUCE S. SEDLEY
BY [signature]
ATTORNEY.

INVENTOR.
BRUCE S. SEDLEY
BY [signature]
ATTORNEY

INVENTOR.
BRUCE S. SEDLEY
BY [signature]
ATTORNEY

ELECTRICAL SWITCH MECHANISM OPERABLE BY ANY OF MANY INTERCHANGEABLE KEY ACTUATORS THAT ARE FREELY INSERTABLE IN AND FREELY REMOVABLE FROM A LOCK PROVIDING PROTECTION AGAINST OPERATION BY OTHER THAN A TRUE KEY ACTUATOR

Filed Feb. 15, 1961

INVENTOR.
BRUCE S. SEDLEY
BY [signature]
ATTORNEY

June 21, 1966 B. S. SEDLEY 3,257,517

ELECTRICAL SWITCH MECHANISM OPERABLE BY ANY OF MANY INTERCHANGEABLE KEY ACTUATORS THAT ARE FREELY INSERTABLE IN AND FREELY REMOVABLE FROM A LOCK PROVIDING PROTECTION AGAINST OPERATION BY OTHER THAN A TRUE KEY ACTUATOR

Filed Feb. 15, 1961 5 Sheets-Sheet 5

INVENTOR.
BRUCE S. SEDLEY
BY
ATTORNEY

United States Patent Office 3,257,517
Patented June 21, 1966

3,257,517
ELECTRICAL SWITCH MECHANISM OPERABLE BY ANY OF MANY INTERCHANGEABLE KEY ACTUATORS THAT ARE FREELY INSERTABLE IN AND FREELY REMOVABLE FROM A LOCK PROVIDING PROTECTION AGAINST OPERATION BY OTHER THAN A TRUE KEY ACTUATOR

Bruce S. Sedley, Fairfax, Calif., assignor to Audio Systems, Inc., a corporation of California
Filed Feb. 15, 1961, Ser. No. 89,466
12 Claims. (Cl. 200—44)

This invention relates to improvements in control means for electrical circuits. More particularly, it relates to a novel electrical switch of the lock-and-key type.

An example will give an idea of how the invention may be used. In many zoos metal standards near animal cages support what looks like a large book, about the size and thickness of a metropolitan telephone book. On the outside of this "book" is a keyhole and a printed legend or explanation; inside the "book" is a loud-speaker. The keyhole leads to a special electrical switch assembly made according to the principles of this invention. At the entrance to the zoo a mechanical vending machine sells plastic keys embodying the principles of this invention. Any of these keys will fit all the locks in that one zoo; when a child buys one of these keys, he can "unlock" every "book" in the zoo. He does this by putting the key in the keyhole and turning the key about 180°.

What happens then is that the key closes a pair of microswitches that are electrically connected in series. When closed, the switches actuate an electrical message-repeater—a type of tape-playback machine—that is located nearby, but is usually not actually in the "book." The message repeater then plays a recorded message over the loud-speaker inside the "book," and the message may be heard by anyone standing near the "book." The message may, for example, be a description of the way the animals live in their native habitat, a poem or song about the animals, or some informative matter which adds to the pleasure of the children at the zoo. Anyone who has a key can hear all the messages in the zoo, but one who does not have a key cannot hear them except by tagging along with someone who has a key. The same thing can be done in museums, nature walks, storybook parks, or wherever an audible description of what is being seen is desired. The invention also has many other uses, most of them apparent to one skilled in this field. For example, a slide projector may replace the message repeater.

An advantage of the system of this invention is that it does away with the nickel-in-the-slot type of operation at each loud-speaker. Keys may be sold from souvenir stands or a few vending machines. Users are encouraged to take the key and use it to hear all the stories about the animals and then to take the key home and bring it back with them the next time they are at the zoo. They can use them again and again and it will always operate all the "books" in the zoo. This encourages reattendance at the zoo, where admission may be charged, and encourages others to visit the zoo. Everyone finds it desirable to have his own key.

From the foregoing it will be seen that one of the main objects of the invention is to provide a customer-operated electrical starting-switch arrangement which is feasible for use by many different customers.

Another object of the invention is to provide a novel lock-and-key arrangement which solves several of the special problems involved in this type of apparatus, such as the temptation of people to try to operate it without one of the keys by using nails or sticks. The invention provides a relatively tamper-proof switch arrangement. This is done by using a plurality of electric switches in series, each switch having its own actuating lever, so that it is very difficult and nearly impossible to depress both switch levers by using one nail, stick, or other article different from the key itself.

Another object of the invention is to provide a key especially well adapted for the purpose and also for use as a souvenir article.

Another object of the invention is to provide an attractive system for encouraging children or adults to patronize an explanation system or story or the like accompanying an exhibit.

Another object is to provide a system wherein differently coded keys may be provided from one zoo or park to another, with the locks in one zoo or park made so that they will not respond to the differently coded keys but only to keys of the code allotted to that particular zoo or park.

A further object is to provide simple means for coding the lock assemblies and the keys.

An additional object is to render the system as nearly foolproof and trouble-free and simple to operate as is in accordance with a system that is operated by large numbers of people, especially by children.

Another object of the invention is to provide a simple assembly enabling easy and rapid changing of the lock combination and also enabling removal of the switches for repair or replacement.

Another object of the invention is to provide a simple bilingual apparatus. Thus, the switch assembly can be so made that keys of one code will operate to cause a broadcast in one language from the tape-playback machine through the loud-speaker, while keys of a different code will operate to cause a broadcast in a different language. Bilingual machines are especially useful in bilingual cities and regions. The same mechanism may also be employed in museums to give different descriptions of the same exhibit, one directed to laymen and another one directed to the specialist.

Other objects and advantages of the invention will appear from the following description of a preferred embodiment thereof.

Figure 1:
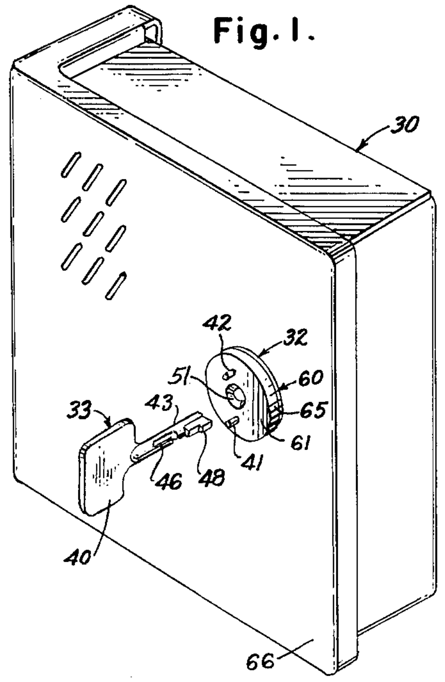
FIG. 1 is a view in perspective of a loud-speaker enclosure having a lock embodying the principles of the present invention, showing a key of this invention about to be inserted into the lock.
Figure 2:
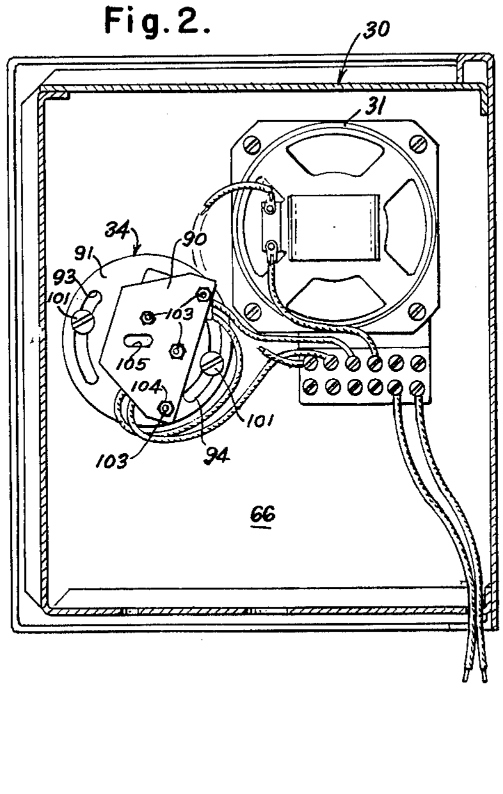
FIG. 2 is a view in rear elevation and in section of the loud-speaker enclosure, showing the loud-speaker and a switch assembly of this invention mounted on the back side of the front wall of the enclosure.
Figure 3:
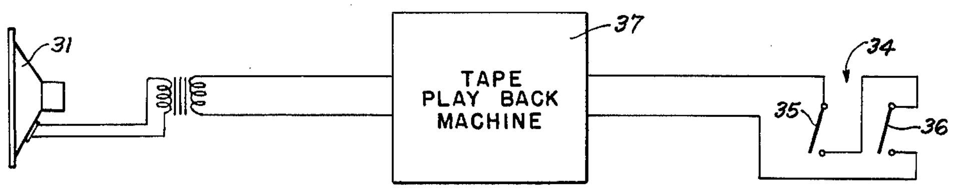
FIG. 3 is a diagrammatic view of an electrical circuit preferably employed in the invention.
Figure 4:
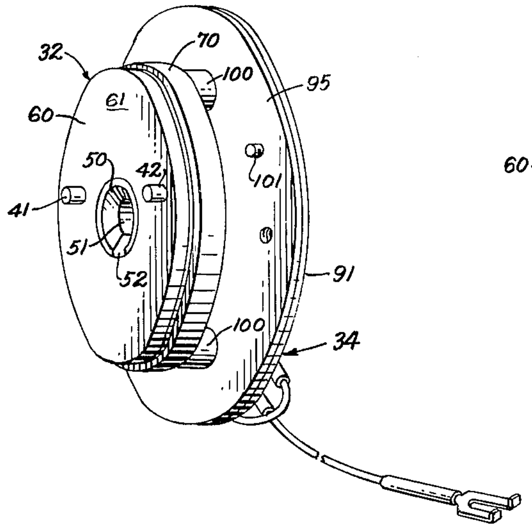
FIG. 4 is a view in perspective on an enlarged scale, looking from the front, of the lock-switch assembly used in the device of FIGS. 1 and 2.

As shown in FIGS. 1, 2, and 3, a typical embodiment of the invention includes a loud-speaker enclosure 30 having a loud-speaker 31 inside and providing a keyway assembly 32, in the inlet end of which a key 33 may be inserted. On the rear side of the keyway assembly 32 is a switch assembly 34 which includes two (or more) switches 35 and 36 in series with each other (see FIG. 3) and with a tape-playback machine 37, preferably a message repeater. When the proper key 33 is inserted all the way into the keyway assembly 32 and is turned 180°, it closes both switches 35 and 36; but unless *both* switches 35 and 36 are simultaneously closed, the machine 37 will not be actuated. Closing both switches 35 and 36 starts the message repeater 37, which then sends its message to the loud-speaker 31. The repeater 37 runs until it completes its message, even though, as is preferable, the key 33 which initiated it is, in the meantime, turned back to its inserting position and withdrawn from the keyway 32. The message will automatically stop when the end is reached, the device employing a well-known expedient in the repeater art for this purpose.

It will be seen that each key 33 has a handle portion 40. Preferably, the key 33 is designed so that when the key 33 is inserted the handle 40 is vertical, since this is the customary way keys and locks are installed. Preferably, the handle 40 may be designed along the lines of one of my design patents, D. 188,343, so that it has a top and a bottom, to enable insertion in exactly the right orientation. A stop member 41 preferably projects from the front wall of the keyhole assembly 32 for the purpose of preventing anyone from turning the key 33 too far, and a similar member 42 may be provided to stop the key from initially being turned in the wrong direction and to stop the key 33 when it is turned back to the location where it can be withdrawn.

Each key 33 has a cylindrical shank 43 provided with certain projections and grooves. A first groove or guide means or axially extending slot 44 on one side of the cylindrical shank 43 extends all the way from an open forward or free end 45 to the handle 40. (See FIGS. 11 and 12.) On the opposite side a short slot 46 extends axially forward from the handle 40 to an arcuately extending circumferential groove 47 that connects the axially extending slot 46 to the slot 44. On the same side as the short slot 46 there is also a projection or trip-and-guide portion 48 which may be located at different positions and may be shaped differently, as will be explained subsequently, in order to provide different codes corresponding with the different codes of different lock-switch assemblies.

Figure 14:
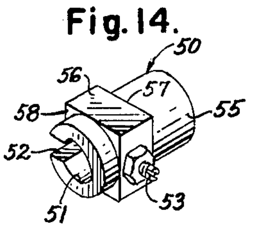
FIG. 14 is a view in perspective of the keyway member of the lock assembly.
Figure 15:
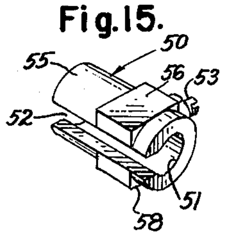
FIG. 15 is another view in perspective from another angle of the keyway member.

The lock assembly 32 includes a keyway member 50 (see FIGS. 14 and 15) shaped generally like an old-fashioned door keyhole with a cylindrical passage 51 and a depending axially extending slot 52, which in this instance, instead of being in a vertical position like the old-fashioned keyhole, preferably lies horizontal so that the shank 43 has no vertical projections interfering with its appearance as viewed from the side. In other words, when the key 33 is installed into the inlet end of the keyway member 50, the projection 48 lies horizontally and extends out to one side. The projection or trip-and-guide portion 48 fits in the slot 52 and slides all the way through it and out beyond the rear end of the keyway 50 before the key 33 can be turned. This helps one to put the key in the right way.

The keyway 50 is also provided with a stop means or member 53 which projects radially into the passage 51 from a point diametrically opposite the slot 52 and intermediate the ends of the keyway 50. The slot 44 in the shank 43 acts as guide means and makes it possible to insert the key 33 relative to the stop pin 53. When the key 33 is pushed all the way in, the circumferential slot 47 is aligned with the member or stop pin 53, so that in this position and in this position only the key 33 can be turned in the keyway 50. Otherwise, the projecting member or stop means 53 will prevent it being turned. Obviously, keys may be coded differently by using different positions for the stop pin 53, which may be a threaded member extending through a threaded hole 54 in the keyway 50. The keyway 50 may have a generally cylindrical exterior surface 55 with a generally square portion 56 in between the ends thereof providing shoulders 57 and 58 on opposite sides of the portion 56 to aid in installing the keyway 50 relative to the members which support it.

Figure 13:
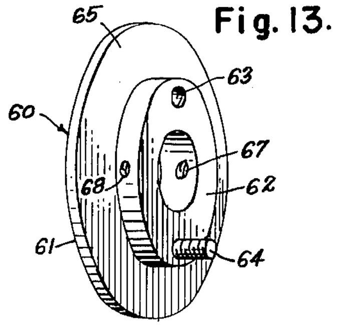
FIG. 13 is a view in perspective looking from the rear of a front plate member used in the lock of the invention.

The keyway 50 is mounted in a front supporting member 60, shown in perspective in FIG. 13. This member 60 carries the stop members 41 and 42 on its front face or cover plate 61 and has a rearwardly projecting annular portion 62 whose rear face is engaged by the shoulder 56 of the keyway 50. The portion 62 also has an axially extending threaded opening 63 and a threaded axial projection 64. A flange 65 fits over the front wall 66 of the loud-speaker enclosure 30. Two radial threaded openings 67 and 68 are provided. In the opening 67 is a set screw 69 for locking the keyway 50 to the plate 60. The other hole 68 is usually left empty except in one combination to be described later.

Figure 16:
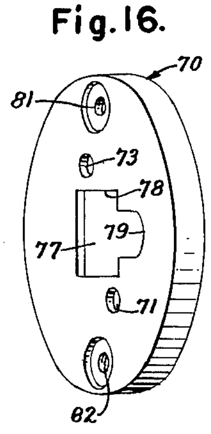
FIG. 16 is a view in perspective from the rear of a supporting member utilized in the assembly of FIGS. 4 and 5 just back of the member of FIG. 13.
Figure 17:
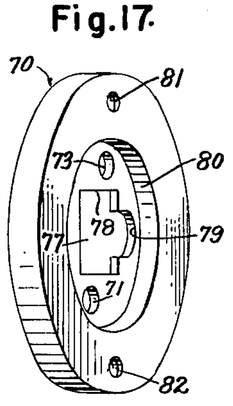
FIG. 17 is a view in perspective from the front of the member of FIG. 16.
Figures 6, 7, 8, 9, 10, 11, 12:
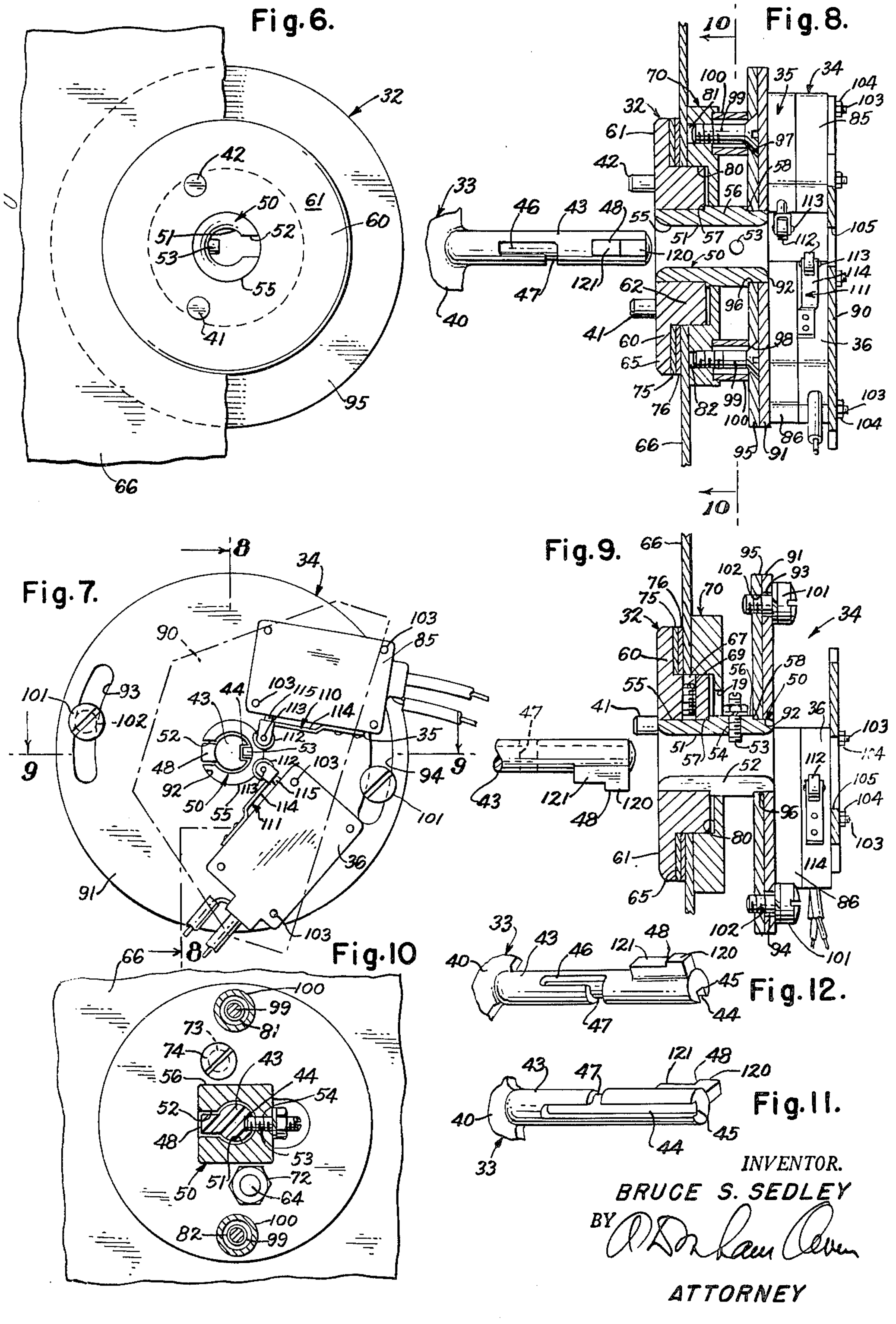
FIG. 6 is a fragmentary view in front elevation of a portion of the front wall of the loud-speaker enclosure, with the right half thereof broken away, showing the assembly of FIGS. 4 and 5 mounted on the wall.
FIG. 7 is a view in rear elevation of the assembly of FIG. 6, with the switch support plate indicated only in broken lines so as to show other portions of the assembly more clearly. The key is shown inserted in the lock.
FIG. 8 is a view in vertical section taken along the line 8—8 in FIG. 7, with the key removed from the lock and shown about to be inserted, its handle being broken off to conserve space.
FIG. 9 is a view in horizontal section taken along the line 9—9 in FIG. 7, with the key shown as in FIG. 8.
FIG. 10 is a view in section taken along the line 10—10 in FIG. 8, with the key inserted in the lock.
FIG. 11 is a fragmentary view in perspective of the shank portion of the key in FIG. 8.
FIG. 12 is a similar view of the same key from a different viewpoint.

A backing or support plate 70, shown in perspective in FIGS. 16 and 17, lies on the opposite side of the front wall of the loud-speaker enclosure 30 from the flange 65. Thus, the cover plate 60 and the backing plate 70 act to clamp the lock assembly 32 to the loud-speaker enclosure 30. The stud 64 extends through a hole 71 in the plate 70 and is tightened to it by a suitable nut 72 (FIG. 10). A similar hole 73 is aligned with the threaded opening 63, and a screw 74 is put through these two holes 63 and 73 and threaded into the hole 63. Thus the stud 64 and the screw 74 hold the two members 60 and 70 tightly together and in doing so hold them tightly to the loudspeaker enclosure 30, clamping it on each side of the wall 66. To prevent leakage of water into the device, one or two gasket members 75 and 76 may be provided between the flange 65 and the wall 66, these being securely tightened to the wall 66 when the members 60 and 70 are tightened together.

As shown in FIGS. 16 and 17, the plate 70 is preferably provided with an opening 77 having a generally square portion 78 and an offset arch portion 79. The square portion 78 receives and is keyed to the square portion 56 of the keyway 50 and thereby helps to lock the keyway 50 against rotation relative to the plates 60 and 70. Of course, other polygonal shapes could be used, but a square shape is very convenient and is easy to make. The offset arch portion 79 provides room so that there is no interference with the tightening of the screw 53 and its nut.

Figures 5, 27:
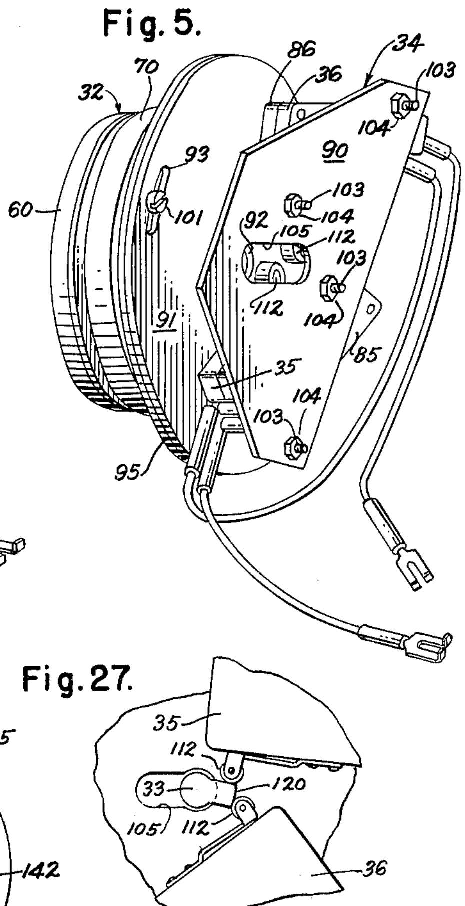
FIG. 5 is a view in perspective of the assembly of FIG. 4, looking from the rear.
FIG. 27 is a fragmentary view in rear elevation of an assembly like that of FIG. 7 showing a key like that of FIG. 20, inserted and turned to close the two switches.

The backing plate 70 is also provided with a cylindrical recess 80 that fits over the cylindrical portion 62 of the plate 60 and with a pair of screw openings 81 and 82 which enable the securing thereto of the switch assembly 34 shown in FIG. 5.

The switch assembly 34 may include, in addition to the two switches 35 and 36, a pair of spacing members 85 and 86 which preferably are empty switch housings. These are shown in FIGS. 8, 9, 21, 23, and 26. In other words, they are exactly the same size as, and in fact are identical with, the housings of the switches 35 and 36 but do not have any actual switch member in them. This enables the use of spacing members of exactly the right size so that combinations can be made between the spacing members 85, 86 and the switches 35 and 36 to provide different code combinations, illustrated in FIGS. 19 through 26 as well as in FIGS. 8 and 9. It will be noted that in some of the forms of the invention (see FIG. 19) the spacing members 85 and 86 are not employed, but these forms will be described later, and they are ones in which the spacing members are not essential, although they still can be used.

The two switch members 35 and 36 and the two spacing members 85 and 86 are supported by a switch-positioning and protective plate 90 which is preferably of the configuration shown in FIGS. 5 and 7, generally resembling a trapezoid with splayed corners at the base. The plate 90 is connected to a disc 91 having a central opening 92 that terminates at about the end of the keyway 50. The disc 91 also has a pair of arcuate slots 93 and 94, preferably diametrically opposite each other. Another disc 95 also has a central opening 96 and has screw-receiving openings 97 and 98 which are aligned with respect to the openings 81 and 82 in the backing plate 70. Screws 99 tighten the disc 95 to the plate 70, spacer washers 100 preferably being used around these screws in between the two members 70 and 95 to help space them apart and to prevent the plate 95 from being bent when the screws 99 are tightened.

The disc 95 then fits snugly up against the shoulder 58 of the keyway 50. The other disc 91 then lies directly on top of the disc 95, so that the thickness of the two discs 91 and 95 is exactly the distance of the shoulder 58 from the end of the keyway 50. A pair of adjusting screws 101 are provided and screw openings 102 are provided on the disc 95. These screws 101 hold the two discs 91 and 95 together and when they are slightly loosened, the arcuate slots 93 and 94 permit relative rotation of the two discs 91 and 95 for the purpose of obtaining an exact adjustment of the switches 35 and 36 relative to the keyway 50. While the openings 93 and 94 need not be as long as those shown, that is a matter of choice, yet having some arcuate adjustment is needed to adjust at this point for any minor differences that may occur in the manufacture of the components.

Thus the disc 91 supports the complete switch assembly 34, and the removal of the screws 101 enables the removal of the disc 91 and, with it, the complete switch assembly 34. Other switch combinations can thus be quickly installed, either to replace a faulty switch or to effectively change the code of the lock by thus installing a new assembly 34. The plate 90 and disc 91 carry the switches 35 and 36 and are secured together by machine screws 103, which go through the switches 35 and 36, and the spacers 85 and 86 and the disc 95 and plate 90 and are tightened there by suitable nuts 104.

Figures 18, 19, 20, 21:
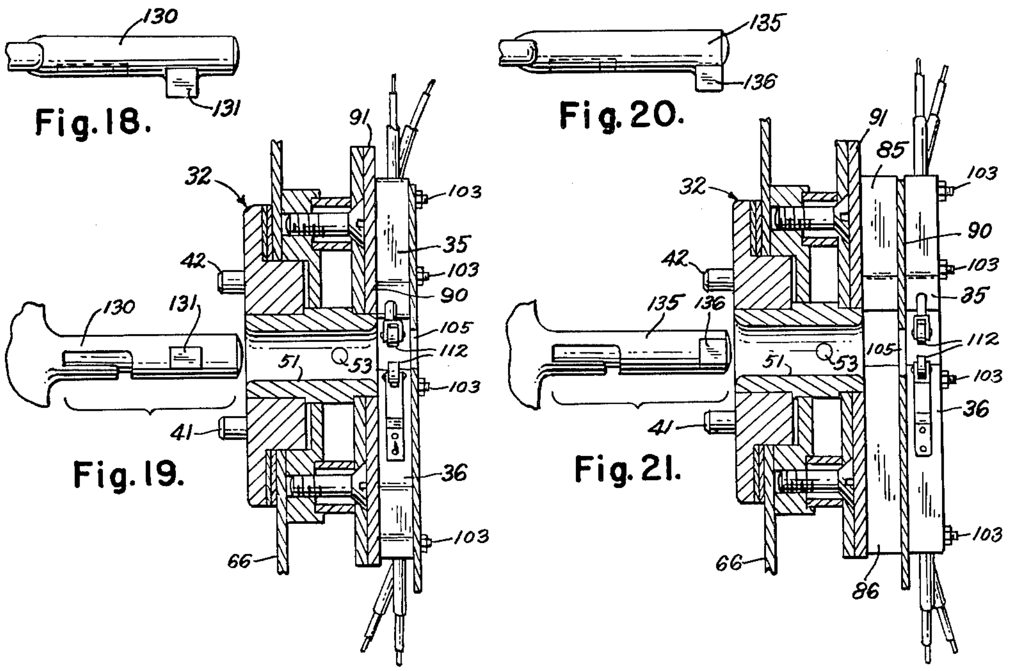
FIG. 18 is a fragmentary top plan view of the shank portion of a modified form of key used with the somewhat different lock-switch assembly of FIG. 17.
FIG. 19 is a view in vertical elevation and partly in section, generally like FIG. 8 and showing the key of FIG. 18, of a modified form of lock-switch assembly.
FIG. 20 is a view like FIG. 18 of another modified form of key.
FIG. 21 is a view similar to FIG. 19 of another modified form of lock-switch assembly.
Figures 22, 23, 25, 26:
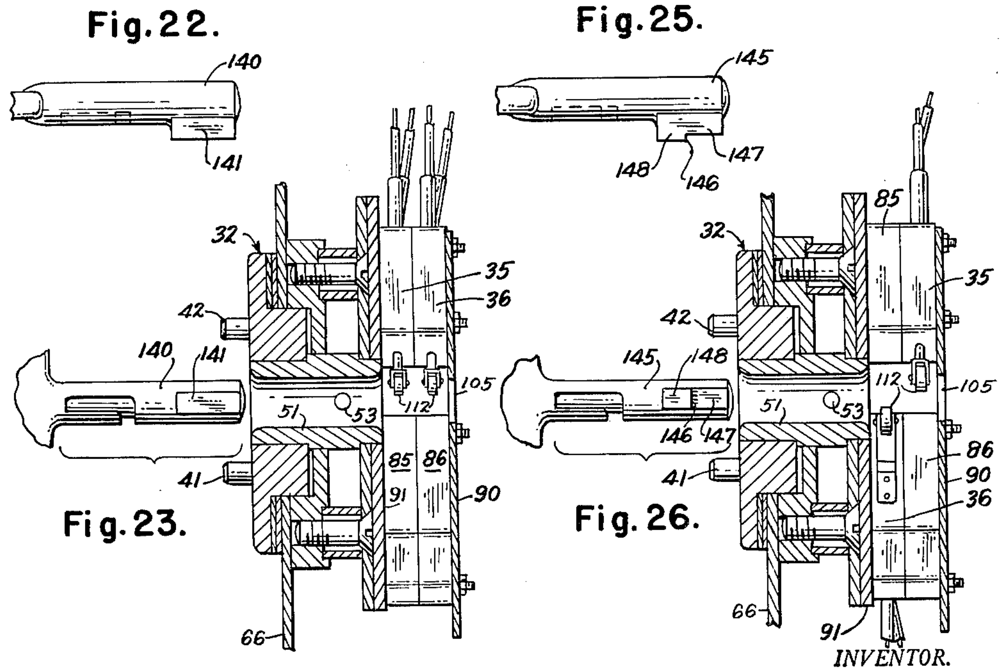
FIG. 22 is another view like FIG. 18 of still another modified form of key.
FIG. 23 is another view like FIG. 19 of a modified form of lock-switch assembly using the key of FIG. 22.
FIG. 25 is still another view like FIG. 18 of yet another modified form of key.
FIG. 26 is still another view similar to FIG. 19 of a modified form of the invention, this one using the key of FIG. 25.

The plate 90 serves a variety of purposes: it helps to prevent a key other than the one designed for the lock from operating the lock; it helps to prevent certain switch combinations or codes from being damaged by the insertion of foreign objects into the lock; it prevents operation by sticks and the like in such a lock combination as that shown in FIG. 21. The plate 90 has an elongated off-center opening 105. This opening 105 is used to permit only the correctly coded key to operate the switches while also preventing broken keys which have been turned to the locked position from being pushed out through the back of the keyway. This point perhaps should be explained. Sometimes when the keys are inserted, the handles 40 are broken off. If the keys are inserted in the keyway 50 and not turned, or turned the wrong way so as to snap them off while leaving them in their insertion position, then there is no problem. They may simply be pushed out the back by inserting another key in the front and pushing. Even if turned, some keys can be pushed out without damage to the lock. If, however, for example, the key 145 of FIG. 25 is put in and turned to the actuating position and then the handle 40 is broken off, it is not desirable to be able to push the key 145 out while it is in that position because the portion 148 would damage the switch lever of the switch 35. Therefore, the shape of the slot 105 is such that the key 145 cannot be forced out when in the actuating position but must be turned around to the non-actuating position and then pushed out. Another reason for doing this is that when a key is broken off in the lock while in the actuating position, the tape repeater 37 keeps repeating its message over and over, and this tends to call the attention of the operator to the deficiency and enables him to come and take corrective steps.

The plate 90 is not required on all switch combinations, though it has been shown by way of an example of a suitable structure. Where the plate 90 is not needed (as in the structure in FIG. 19), keys broken off in the locked position may be pushed out by the next key inserted, the slot 46 enabling the pin 53 to clear as the broken shank is ejected. Each switch element 35, 36 has a switch lever or actuation means 110, 111. The switches 35, 36 may be of the type known as microswitches and the switch lever 110, 111 may comprise a free rotating roller 112 mounted on a journal 113 at the end of a leaf spring 114 with the other side of the leaf spring 114 resting on a spring-mounted button 115 (FIG. 7) which projects out of the switch housing. The button 115 is spring-urged outwardly and closes the contacts of the switch 35 or 36 when forced inwardly. Thus, when the rollers 112 are pressed in and move the button 115 in, the switch 35 or 36 is actuated. The rollers 112 provide a contact surface that engages the projecting trip-and-guide portion 48 of the key 33. Their use means that the buttons 115 can move lineally while the rollers 112 rotate to accommodate the turning movement of the key projection 48.

The switches 35 and 36 are mounted in all instances with the two rollers 112 closely adjacent each other, so that the portion 48 of the key will actuate both rollers 112 when the key is turned to a particular position. Once the switches 35 and 36 are installed between the plate 90 and the disc 91, exact regulation of their position in respect to the key is obtained by rotating the disc 91 relative to the disc 95, using the arcuate slots 93, 94 and the screws 101 for this purpose. Normally this is done by placing a key 33 in the keyway 50, turning it into the locked or actuation position and then carefully rotating the lock assembly 34 until the switches are actuated at exactly the right point. Then the screws 101 are tightened. No individual positional adjustment of the individual switches 35 and 36 is required, as the switches are manufactured to close tolerances, and the switch mounting holes for the screws 103 are accurately placed.

As has been stated before, a series of switch-mounting patterns necessitating different codes of keys for actuating them can be obtained by varying the relationship between the switches 35, 36, the plate 90, and the spacer members 85 and 86. Thus, in the form of the invention shown in FIG. 8, the projecting trip-and-guide portion 48 has two portions 120 and 121, one longer than the other, the longer portion 120 being at the end, the shorter portion 121 spaced back from the end. Here the switches 35, 36 are mounted facing each other, with their rollers 112 on opposite sides of the line 9—9 in FIG. 7 and with the switches 35, 36 and the spacer members 85, 86 so arranged that the switch 35 is closer to the keyway 50 than the switch 36, the spacer 86 lying between the switch 36 and the disc 91 while the spacer 85 lies between the plate 90 and the switch 35. In this position, when the key 33 is turned to the actuating position, the longer portion 120 is just long enough so that its top surface actuates the switch 36, as shown in FIG. 27, while the switch 35 is simultaneously actuated by the side surface of the shorter portion 121. The switches 35 and 36 are thus operated by the key 33 in two opposite directions at the same time, a further discouragement to accidental operation by the insertion of a foreign object. Such actuation, as stated, causes the message repeater 37 to begin playing its message over the loud-speaker 31, and the key 33 may be withdrawn as soon as the repeater 37 starts, because the repeater 37 includes a suitable holding relay, not shown because it is well known in the art.

Other arrangements of the switches are shown in FIGS. 18 to 26. In the arrangement shown in FIGS. 18 and 19, a key 130 has a projecting portion 131 half as long as the portion 48 and spaced back from the end of the key. In this form of the inventioon no spacers 85, 86 are used and the two switches 35 and 36 are placed directly opposite each other and in the same plane. Therefore, the projecting member 131 is able to actuate both switches 35 and 36, its top surface operating the switch 36 while its side surface operates the switch 35.

The key 130 used in FIG. 18 will not actuate the device of FIGS. 6 through 10, because the key 130 would actuate only one of the two switches, the switch 35. Moreover, the key 33 will not actuate the lock of FIG. 19 because the plate 90, when in the position of FIG. 19, would prevent the key 33 from turning.

FIGS. 20 and 21 show a different key-lock combination closely allied to that of FIG. 19 in which a short trip-and-guide portion 136 is located at the very end of a key 135 rather than being spaced back from it as in FIG. 18. In this instance the two spacers 85 and 86 are both between the disc 91 and the plate 90, while the two switches 35 and 36 are both located in the same plane and on the opposite side of the plate 90 from the spacers 85 and 86. In this position, when the key 135 is inserted, the two coplanar switches 35 and 36 are operated by the single short projecting portion 136. The top surface of the portion 136 operates the switch 36, while the side surface of the same portion 136 operates the switch 35.

It will be apparent that the key 130 of FIG. 18 would not operate the switches 35 and 36 when they are arranged as in FIG. 21, for the projecting member 131 would not extend far enough. Moreover, the key 135 of FIG. 20 would not operate the lock of FIG. 19 because the projecting portion 136 would lie beyond the two switches 35 and 36 when inserted far enough so that the key 135 could be turned. In other words, one cannot insert the key 135 part way and then turn it, because the member 53 prevents the key 135 from turning except when it is fully inserted. It will also be apparent that the key 33 would not operate the lock of FIG. 21 because, having two portions 120 and 121, the plate 90 would prevent the key 33 from turning. And of course the key 135 of FIG. 20 would not operate the switch assembly of FIGS. 6 to 10 because only one of the switches (the switch 36) would be closed, instead of both switches being closed.

Figure 24:
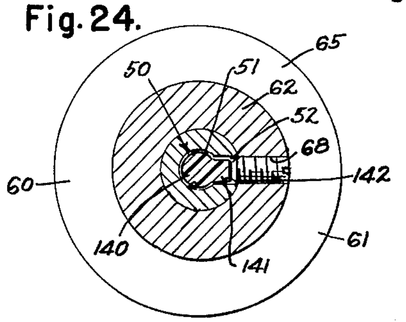
FIG. 24 is a view in elevation, partly broken away and shown in section of the lock-switch assembly of FIG. 23, with the key inserted.

In FIGS. 22–24 a key 140 is shown having a double-length projecting portion 141, the amount of projection being that of the portion 121 of the key 33. In this case the two switches 35 and 36 are placed on top of each other, and the two spacers 85 and 86 are placed opposite them. In this structure, the switches 35 and 36 being placed at identical locations, it is obvious that the side surface of the projecting portion 141 will operate both the switches 35 and 36.

It will be apparent that the keys 131 and 135 of FIGS. 18 and 20 cannot operate the switch of FIG. 23 because they have only one projecting portion 131 or 136 and can operate only one switch, not both switches in series. It is also apparent that the key 140 of FIG. 22 could not be turned in the locks of either FIGS. 19 or 21 because the plate 90 prevents the key 140 from turning, since it would lie in the middle of the portion 141. And even if it is allowed to turn, its projection 141 is too short to actuate the switch 36. The key 33 will not work in the lock of FIG. 23 because a screw 142 is inserted in the opening 68 (see FIG. 24) to prevent such keys 33 even entering the lock by stopping the long portion 120. Only short portions are admitted and only the key 140 has only short portions. Similarly, the key 140 of FIG. 22 could not be used in the lock of FIGS. 6 to 10 because its outer portion is too short and therefore it would actuate only the inner switch 35. Thus the insertion of the screw 142 prevents any key other than the key 140 from even entering the lock combination of FIG. 23.

FIGS. 25 and 26 show a fifth form of lock-and-key arrangement that can be used. The key 145 resembles the key 33 except that it is reversed. In other words, the shorter portion 147 is at the end and the longer portion 148 of the projecting portion 146 is spaced from the end. The switches 35 and 36 are therefore also reversed with the switch 35 being beyond the switch 36 and the spacers 85 and 86 similarly being reversed. The side surface of the shorter portion 147 operates the switch 35, while the top surface of the longer portion 146 operates the switch 36.

Once again, the keys 130 and 135 of FIGS. 18 and 20 cannot operate the lock of FIG. 26, because each would operate only one of the two switches. The key 33 of FIGS. 6 to 10 would not operate the lock of FIG. 26 because the projecting portions are reversed and therefore only one of the switches would be operated, the one engaged by the side surface of the longer projecting portion 148, the switch 36 being passed by the short portion 148 without its roller 112 being contacted. The reverse would apply for the use of key 145 of FIG. 25 in the lock of FIGS. 6 to 10, where again only one switch would be operated. In the instance of the key 140 of FIG. 22, it will not operate the lock of FIG. 23 because its portion 141 will contact only the outer switch 36 and will the inner switch 35, due to the lower height of the projecting portion 141. Finally, the key 145 of FIG. 25 cannot be inserted into the lock of FIG. 23 because of interference from the screw 142 engaging the portion 148.

Thus it will be obvious that a very simple permutation of switches, switch plates, and spacers makes it possible to obtain these five combinations. A sixth combination, in which the two rollers 112 are both located for actuation by projections like the portions 120 and 148 at a greater distance so that it would correspond to a long position, is possible, but its key would also operate some of the other combinations and therefore the locks would not be mutually exclusive. In addition, it will be apparent that still other combinations can be used if desired by varying the slot patterns and other things. Similarly, if desired, three switches can be used in series, or more switches can be used, to come up with still different patterns which are mutually exclusive, and which could control other devices, such as lights, motors, and relays, as well as a tape-playback machine.

Figure 28:
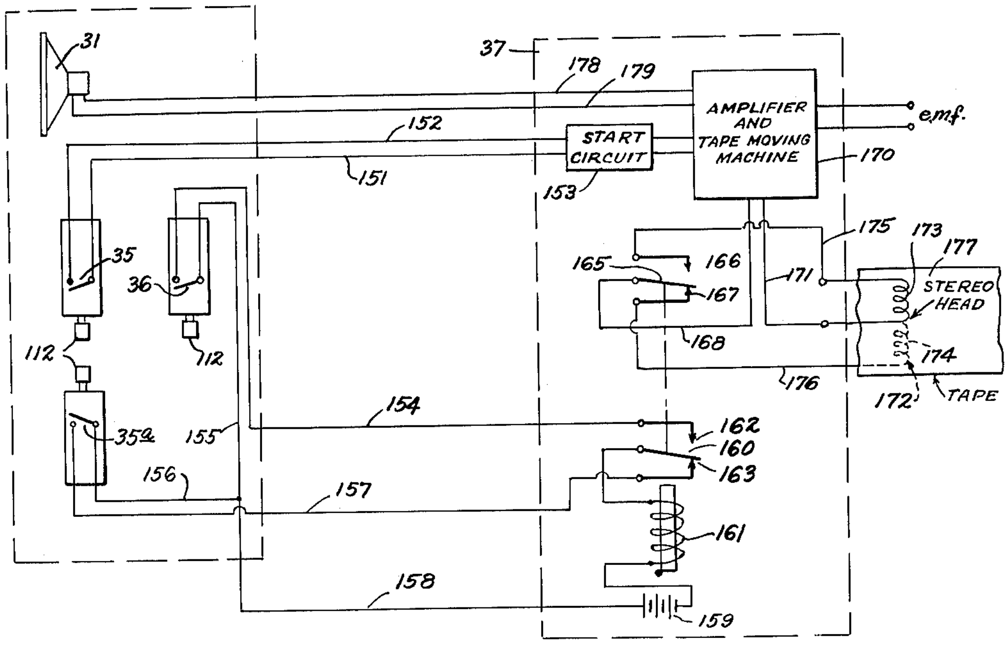
FIG. 28 is a circuit diagram of a circuit enabling bilingual operation.
Figure 29:
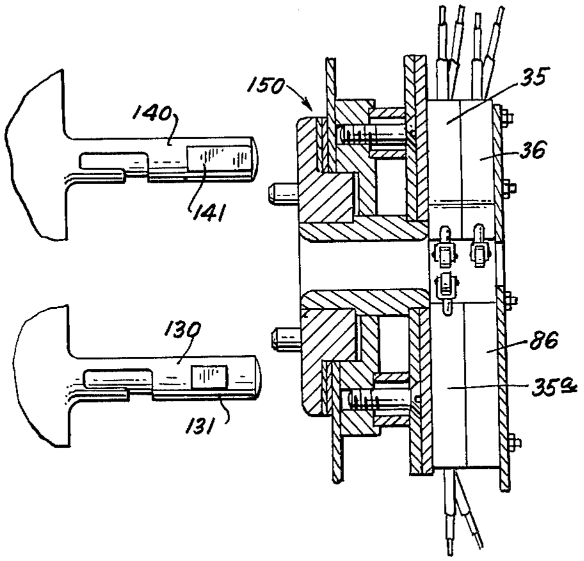
FIG. 29 is a view like FIG. 8 of a switch assembly for the bilingual circuit of FIG. 28, using different keys for the different languages.

FIGS. 28 and 29 show how the device may be used in a bilingual system. Let us say, for example, that the system is to set up in a city such as Hong Kong where there are both Chinese and English listeners. By buying one key labeled "Chinese" the Chinese may hear a message in Chinese while by buying another key labeled "English" the English listeners may hear the same message in English. In this instance switches 35 and 36 are arranged as in FIG. 23 and an additional switch 35[a] is inserted in place of the empty switch housing 85 of FIG. 23. The switches 35 and 35[a] provide substantially the same structure as that shown by FIG. 19 and can be operated by the key 130, with the top surface of the projection 131 operating the switch 35[a] while the side surface of the portion 131 operates the switch 35. Similarly, the switches 35 and 36 are operated exactly as they are in FIG. 23 by the key 140, the side surface of the projection 141 operating both the switches 35 and 36. Thus, for all practical purposes, there are two switch combinations each operated by a differently coded key, both switch combinations being mounted in the same assembly.

FIG. 28 is a circuit diagram showing how the switches 35, 36, and 35[a] may be wired to give the desired bilingual effect. The switch 35 is connected by lines 151 and 152 to a start circuit 153 which turns on an amplifier and tape-playback machine 170, thereby causing the tape to traverse the heads and to start playing the message over the loud-speaker 31. The switch 36, when closed, connects lines 154 and 155, while the switch 35[a], when closed, connects lines 156 and 157. The lines 155 and 156 are connected together to a line 158 which is in series with a battery 159 or other source of a suitable voltage. Thus, closure of either of the switches 36 or 35[a] closes an otherwise open circuit that is in series with the battery 159.

A switch arm 160 of a well-known type of latching relay having an actuating coil 161 is mounted between a terminal 162 on the line 154 and a terminal 163 on the line 157. For example, if the switch 36 is closed when the arm 160 lies against the contact 163, current from the battery 159 energizes the coil 161 and thereby unlatches the arm 160 and moves it against the contact 162, where it latches mechanically. If the arm 160 had previously been against the contact 162, the arm 160 would have remained there. If the switch 35[a] is then closed, the switch 160 will be unlatched from the contact 162 and moved against the contact 163.

The switch 160 is ganged with a switch 165 which is mounted between contacts 166 and 167 and is connected by a line 168 to an amplifier 170. Another line 171 comes from the amplifier 170 to the center 172 of a coil system comprising a stereophonic tape head having an upper coil 173 and lower coil 174. The stereo head is mounted in the normal manner, the other side of the coil 173 is connected by line 175 to the contact 166, while the stereo head 174 is connected by line 176 to the contact 167. Like all stereo heads, one head portion 173 is mounted above a tape 177 while the other portion 174 is mounted below the tape 177 and on the other side. Thus the device preferably uses four-track stereo tape, the stereo head being used as a convenience, although other systems could of course be used instead of this commonly manufactured one and easily obtained one.

When the switch arm 165 is against the contact 166 the stereo head 173 is operated and the stereo head 174 is not operated. Similarly, when the switch 165 is against the contact 167 only the stereo head 174 is operating. Now on the stereo head 173 the tape 177 is arranged so that that portion read by the portion 173 plays Chinese while the portion of the stereo head 174 plays English. Consequently the lines 178 and 179 leading from the amplifier 170 to the loud-speaker 31 will, when the tape is started, play either English or Chinese depending on whether the switch 36 or the switch 35[a] has been operated simultaneously with the switch 35, and that in turn depends on whether the key 130 or the key 140 has been inserted into the assembly 150. Thus one language only will be played. The language will be that at which the last previous key was designed to play and any key inserted will impress its language upon the machine at any time it is inserted.

Other switch assemblies may be made. Three switches may be placed out in series and different forms of keys used. There may be three or four or five switches arranged similarly for use with keys having longer projections or different kinds of projections. Four switches may be used to provide a somewhat similar system by using a different kind of head and tape arrangement and other different kinds of devices may be used.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A key-operated electric switch assembly, including in combination:
   keyway means with an inlet end, a rear end, a cylindrical passage, and an axially extending slot leading radially from said passage, both said passage and said slot extending the full distance between said ends;
   stop means projecting into said cylindrical passage from a point in between said ends;
   a plurality of completely separate electrical switches mounted beyond said rear end with completely separate actuation means closely adjacent each other beyond said passage; and
   a freely removable key having a cylindrical shank longer than said keyway passage with a free end and insertable through said passage from said inlet end so that said free end projects beyond said rear end
   and having adjacent said free end a radially outwardly projecting trip-and-guide portion lying radially beyond said shank and slidable through and beyond said slot, which, when said key is fully inserted and is turned, simultaneously actuates a plurality of said switch actuation means,
   said shank also having guide means enabling full insertion in an axial line without interference by said stop pin,
   said shank also having an arcuate slot extending generally circumferentially from said guide means to enable rotation of said key relative to said stop pin when said key is fully inserted.

2. A key-operated electric switch assembly, including in combination:
   keyway means with an inlet end and a rear end, a cylindrical passage, and an axially extending slot radially outside said passage and integral with it, both said passage and said slot extending the full distance between said ends;
   a stationary stop pin projecting radially into said cylindrical passage from a point diametrically opposite said slot;
   a pair of separate and distinct electrical switches mounted beyond said rear end with separate and distinct movable actuation means that lie closely adjacent each other beyond said passage approximately in line axially with said stop pin; and
   a fully removable key having a generally cylindrical shank longer than said keyway passage and having a free end and insertable through said passage so that said free end projects beyond said rear end and having adjacent said free end a trip-and-guide portion projecting radially out from said shank and slidable through said slot to a point beyond said rear end when fully inserted and that, when then turned 180°, actuates both said switch levers, said shank also having an axially extending slot opposite said trip-and-guide portion enabling insertion of said shank without interference by said stop pin, said shank also having an arcuate slot extending about 180° circumferentially from the shank's said axially extending slot to enable rotation of said key without interference from said stop pin when said key is fully inserted.

3. A key-operated electric switch assembly, including in combination:

keyway means with an inlet end and a rear end and having a cylindrical passage and an axially extending slot leading radially from said passage, both said passage and said slot extending the full distance between said ends;

a stationary stop pin projecting radially into said cylindrical passage from a point radially opposite said slot;

a pair of completely separate electrical switches mounted beyond said rear end, each switch having its own separate and distinct movable spring-mounted lever, said levers being closely adjacent each other beyond said passage but generally tangential to a continuation thereof of the cylindrical keyway and approximately in line with said stop pin; and a set of freely and fully removable keys, each key comprising a handle and a generally cylindrical shank longer than said keyway passage and having a free end and insertable in said passage so that said free end projects beyond said rear end and having adjacent said free end a trip-and-guide portion projecting radially out from said shank and slidable through said slot to a point beyond said rear end when fully inserted and that, when then turned 180°, actuates both said switch levers, said shank also having an axially extending slot opposite said trip-and-guide portion enabling insertion of said shank without interference by said stop pin, said shank also having an arcuate slot extending about 180° circumferentially from said axially extending slot of said shank to enable rotation of said key without interference from said stop pin when said key is fully inserted.

4. A key-operated electric switch assembly, including in combination:

a housing member having keyway means with an inlet end, a rear end, and a through passage between said ends;

means in said passage controlling the turning of a key inserted therein;

a support plate in a plane perpendicular to the axis of said passage secured to and spaced from said housing member opposite said rear end, said support plate having two plane surfaces;

two pairs of identical electrical switch housings mounted on said support plate, the switch housings of each pair lying side by side in the same plane and at least one pair lying between said plate and said rear end, the other pair being aligned with said one pair and lying further from rear end;

switches in some of said housings, the other said housings being dummy spacers, said switches each having its own separate and distinct actuation means closely adjacent each other beyond said passage; and a set of interchangeable keys, each key having a shank longer than said passage with a free end and removably inserted through said passage from said inlet end so that said free end projects beyond said rear end and having switch operating means adjacent said free end which when said key is fully inserted and is turned, simultaneously actuates a plurality of said actuation means.

5. A key-operated electric switch assembly, including in combination:

a housing member having keyway means with an inlet end, a rear end, and a through passage of distinctive configuration between said ends excluding entry of a wide range of implements that might be used in attempts to obtain unauthorized operation or in tampering;

means in said passage controlling the turning of a key inserted therein;

a support plate in a plane perpendicular to the axis of said passage secured to and spaced from said housing member opposite said rear end;

a pair of identical but separate and distinct electrical switches mounted on said support plate side by side in the same plane and between said plate and said rear end, wired in series with each other and having separate and distinct actuation means closely adajcent each other beyond said passage; and a freely removable key having a distinctive configuration for engagement of that of said keyway means having a shank longer than said passage with a free end and removably inserted through said passage from said inlet end so that said free end projects beyond said rear end and having switch engagement means adjacent said free end which, when said key is fully inserted and is turned, simultaneously actuates all said actuation means.

6. A key-operated electric switch, including in combination:

a housing member having keyway means with an inlet end, a rear end, and a through passage of distinctive configuration between said ends for excluding entry of most types of unauthorized members;

means in said passage for controlling the turning of a key inserted therein;

a support plate in a plane perpendicular to the axis of said passage secured to and spaced from said housing member opposite said rear end;

a plurality of identical electrical switch housings mounted on said support plate, at least two of said switch housings lying side by side between said plate and said rear end, the other housings being aligned with those two housings and lying further from rear end; and a plurality of separate and distinct switches, each in one of said housings, housings without a said switch therein being dummy housings, and having separate and distinct actuation means closely adjacent each other beyond said passage.

7. A key-operated electric switch, including in combination:

a housing member having keyway means with an inlet end, a rear end, and a through passage between said ends;

means in said passage for controlling the turning of a key inserted therein;

a support plate in a plane perpendicular to the axis of said passage secured to and spaced from said housing member opposite said rear end;

two pairs of identical but separate and distinct electrical switch housings mounted on said support plate, at least one pair of said switch housings lying side by side between said plate and said rear end, the other housings being axially aligned with the housings of said one pair and lying further from rear end; and a pair of separate and distinct switches, one in each of two said housings, wired in series with each other, the other said housings being dummy housings, said switches each having actuation means closely adjacent each other beyond said passage.

8. A key-operated electric switch assembly, including in combination:

a key having a cylindrical shank with a free end, a radially outwardly projecting trip-and-guide portion adjacent said free end, a guide slot, and an arcuate slot extending generally circumferentially from said guide slot, said switch comprising in combination:

keyway means with an inlet end, a rear end, a cylindrical passage for reception of said shank, and an axially extending slot leading radially from said passage for reception of said trip-and-guide portion, both said passage and said slot extending the full distance between said ends, said distance being shorter than said shank;

stop means projecting into said cylindrical passage from a point in between said ends and outside said axially extending slot and engageable in said guide and arcuate slots so that said key can be inserted with said trip and guide portion aligned with said axially extending keyway slot and with said stop means aligned with said guide slot and then can be turned when said stop means is aligned with said arcuate stop; and a plurality of separate and distinct electrical switches wired in series with each other and mounted beyond said rear end and having separate and distinct actuation means closely adjacent each other beyond said passage for engagement by said trip-and-guide portion when said key is fully inserted in said keyway means and turned, both said switches having to be operated to close their series circuit, thereby preventing operation by objects other than a proper said key.

9. A key-operated electric switch for use with a key having a generally cylindrical shank with a free end, an outwardly projecting trip-and-guide portion, an axially extending slot opposite said trip-and-guide portion and an arcuate slot extending about 180° circumferentially from said axially extending slot, said switch including in combination:

keyway means with an inlet end and a rear end and having a cylindrical passage for reception of said shank and an axially extending slot leading radially from said passage for reception of said trip-and-guide portion, both said passage and said slot extending the full distance between said ends, said distance being shorter than said shank so that when said key is inserted, said trip-and-guide portion lies fully beyond said keyway;

a stationary stop pin projecting radially into said cylindrical passage from a point radially opposite said keyway slot for engagement in said axial and arcuate slots; and a pair of separate and distinct electrical switches wired in series with each other and mounted beyond said rear end, each switch having a movable spring-mounted lever, said levers being closely adjacent each other beyond said passage but generally tangential to a continuation thereof of the cylindrical keyway and approximately in line with said stop pin, for actuation by said trip-and-guide portion when said key is inserted and turned.

10. A key for a key-operated electric switch assembly having keyway means with an inlet end, a rear end, a cylindrical passage, and an axially extending slot leading radially from said passage, both said passage and said slot extending the full distance between said ends, said keyway means having stop means projecting into said cylindrical passage from a point in between said ends, and a plurality of electric switches mounted beyond said rear end and having actuation means closely adjacent each other beyond said passage, said key having a cylindrical shank longer than said keyway passage and with a free end and adjacent thereto, a trip-and-guide portion projecting radially outwardly from said shank for actuation of said plurality of electrical switches, said shank also having a guide slot extending from said free end enabling full insertion without interference by said stop pin, and an arcuate slot extending generally circumferentially from said guide slot intermediate said ends enabling rotation of said key relative to said stop pin when said key is fully inserted.

11. A key for a key-operated electric switch assembly having keyway means with an inlet end, a rear end, a cylindrical passage, and an axially extending slot leading radially from said passage, both said passage and said slot extending the full distance between said ends, said keyway means having stop means projecting into said cylindrical passage from a point in between said ends, and a plurality of electrical switches mounted beyond said rear end and having actuation means closely adjacent each other beyond said passage;

said key having a cylindrical shank longer than said keyway passage with a free end and insertable through said passage from said inlet end so that said free end projects beyond said rear end and having adjacent said free end a trip-and-guide portion projecting radially out from said shank and slidable through and beyond said slot and that when said key is fully inserted and is turned simultaneously actuates a plurality of said switch levers, said shank also having guide means enabling full insertion without interference by said stop pin, said shank also having an arcuate slot extending generally circumferentially from said guide means to enable rotation of said key relative to said stop pin when said key is fully inserted.

12. A key-operated electric switch assembly, including in combination:

a housing member having keyway means with an inlet end, a rear end, and a through passage between said ends;

means in said passage controlling the turning of a key inserted therein;

a support plate in a plane perpendicular to the axis of said passage secured to and spaced from said housing member opposite said rear end;

a plurality of identical electrical switch housings mounted on said support plate, at least two of said switch housings lying side by side between said plate and said rear end, the other housings being aligned with those two housings and lying further from rear end;

at least three separate and distinct switches, one in each of three said housings, a first said switch being associated with each of a second and third said switch, said switches each having its own separate actuation means closely adjacent each other beyond said passage; and two freely removable keys each having a shank longer than said passage with a free end and freely inserted through said passage from said inlet and so that said free end projects beyond said rear end and each having switch energization means adjacent said free end which, when one said key is fully inserted and is turned, simultaneously actuates said actuation means for said first and second switches and, when the other said key is fully inserted and is turned simultaneously actuates said actuation means for said first and third switches.

(References on following page)

References Cited by the Examiner

UNITED STATES PATENTS

| | | | |
|---|---|---|---|
| 1,364,736 | 1/1921 | Domanski | 70—403 X |
| 1,591,646 | 7/1926 | Schaefer | 200—44 |
| 1,781,962 | 11/1930 | Stirling. | |
| 1,846,513 | 2/1932 | Douglas. | |
| 2,060,951 | 11/1936 | Rae et al. | 200—44 |
| 2,098,249 | 11/1937 | Kistner | 70—403 X |
| 2,152,450 | 3/1939 | Arcelon. | |
| 2,597,969 | 5/1952 | Barton | 200—44 |
| 2,637,844 | 5/1953 | Thompson | 200—42 |
| 2,662,131 | 12/1953 | Cerna et al. | 200—44 |
| 2,702,321 | 2/1955 | Brown et al. | 200—153 X |
| 2,868,906 | 1/1959 | Sorenz | 200—44 |
| 2,892,040 | 6/1959 | Johnson et al. | 179—100.2 |

| | | | |
|---|---|---|---|
| 2,911,482 | 11/1959 | Dostert | 179—100.2 |
| 2,921,299 | 1/1960 | Zimmerman | 200—44 X |
| 3,059,069 | 10/1962 | Sedley | 200—44 X |

FOREIGN PATENTS

| | | |
|---|---|---|
| 1,105,573 | 5/1954 | France. |
| 1,198,397 | 7/1958 | France. |
| 365,551 | 12/1922 | Germany. |
| 377,358 | 10/1921 | Germany. |

BERNARD A. GILHEANY, *Primary Examiner.*

JOHN P. WILDMAN, ROBERT K. SCHAEFER, J. R. GOUDEAU, THOMAS A. ROBINSON, HERBERT A. LEWITTER, *Assistant Examiners.*